(12) United States Patent
Seol (10) Patent No.: US 12,065,118 B2
(45) Date of Patent: Aug. 20, 2024

(54) BRAKE PEDAL ASSEMBLY, BRAKE APPARATUS FOR VEHICLE INCLUDING THE SAME, AND CONTROL METHOD THEREOF

(71) Applicant: HYUNDAI MOBIS CO., LTD., Seoul (KR)

(72) Inventor: Yong Cheol Seol, Hwaseong-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 237 days.

(21) Appl. No.: 17/529,857

(22) Filed: Nov. 18, 2021

(65) Prior Publication Data
US 2023/0054790 A1    Feb. 23, 2023

(30) Foreign Application Priority Data

Aug. 18, 2021    (KR) .................. 10-2021-0108688

(51) Int. Cl.
*B60T 8/32* (2006.01)
*B60T 7/04* (2006.01)
(Continued)

(52) U.S. Cl.
CPC .............. *B60T 8/326* (2013.01); *B60T 7/042* (2013.01); *B60T 8/92* (2013.01); *B60T 13/686* (2013.01);
(Continued)

(58) Field of Classification Search
CPC . B60T 8/326; B60T 7/042; B60T 8/92; B60T 13/686; B60T 17/221; B60T 2220/04; B60T 2270/406; B60T 2270/82; B60T 2270/40; B60T 2270/404; B60T 11/10; B60T 11/18; B60T 17/18; B60T 17/22;
(Continued)

(56) References Cited

U.S. PATENT DOCUMENTS

| 2002/0117893 A1* | 8/2002 | Shaw | ................ B60T 8/3255 |
| | | | 188/151 A |
| 2008/0255797 A1 | 10/2008 | Cordesses et al. | |

(Continued)

FOREIGN PATENT DOCUMENTS

| DE | 198 55 358 A1 | 6/2000 |
| DE | 10 2004 029 193 A1 | 1/2006 |

(Continued)

OTHER PUBLICATIONS

Extended European search report issued on Jun. 20, 2022, in counterpart European Patent Application No. 21209834.7 (7 pages in English).

(Continued)

*Primary Examiner* — Kurt Philip Liethen
(74) *Attorney, Agent, or Firm* — NSIP Law (57) ABSTRACT

Disclosed are a brake pedal assembly, a braking apparatus, and a control method, where the brake pedal assembly includes a pedal, a stroke sensor configured to detect a depression stroke of the pedal, Hall sensors spaced apart from each other in a direction parallel to an operation direction of the pedal, and a controller configured to determine the depression stroke of the pedal using any one or any combination of the stroke sensor and the Hall sensors and to determine a required braking force of a vehicle, in response to the depression stroke of the pedal.

10 Claims, 5 Drawing Sheets

(51) Int. Cl.
*B60T 8/92* (2006.01)
*B60T 13/68* (2006.01)
*B60T 17/22* (2006.01)
*G01D 5/14* (2006.01)

(52) U.S. Cl.
CPC ............ *B60T 17/221* (2013.01); *G01D 5/145* (2013.01); *B60T 2220/04* (2013.01); *B60T 2270/406* (2013.01); *B60T 2270/82* (2013.01)

(58) Field of Classification Search
CPC . B60T 17/223; B60T 7/04; B60T 8/36; G01D 5/145; B60Y 2304/05; B60Y 2306/15; B60Y 2400/3012
See application file for complete search history.

(56) References Cited

U.S. PATENT DOCUMENTS

| | | | |
|---|---|---|---|
| 2018/0162330 A1 | 6/2018 | Odaira et al. | |
| 2020/0391706 A1* | 12/2020 | Street | B60T 7/042 |
| 2022/0055582 A1 | 2/2022 | Takimoto et al. | |
| 2022/0144224 A1* | 5/2022 | Tarandek | G05G 5/03 |
| 2023/0192040 A1* | 6/2023 | Schaust | F16C 1/145 |
| | | | 188/358 |

FOREIGN PATENT DOCUMENTS

| | | |
|---|---|---|
| FR | 2 897 933 A1 | 8/2007 |
| JP | 2000-161986 A | 6/2000 |
| JP | 2008-513281 A | 5/2008 |
| JP | 2017-177849 A | 10/2017 |
| KR | 10-2015-0137719 A | 12/2015 |
| KR | 10-2019-0016268 A | 2/2019 |
| WO | WO 2013/043772 A1 | 3/2013 |
| WO | WO 2016/194611 A1 | 12/2016 |
| WO | WO 2020/116220 A1 | 6/2020 |

OTHER PUBLICATIONS

Korean Office Action issued on Mar. 28, 2023, in counterpart Korean Patent Application No. 10-2021-0108688 (7 pages in English, 6 pages in Korean).

\* cited by examiner

BRAKE PEDAL ASSEMBLY, BRAKE APPARATUS FOR VEHICLE INCLUDING THE SAME, AND CONTROL METHOD THEREOF

CROSS-REFERENCE TO RELATED APPLICATIONS

This application the benefit under 35 USC § 119(a) of Korean Patent Application Number 10-2021-0108688, filed on Aug. 18, 2021, in the Korean Intellectual Property Office, the entire disclosure of which is incorporated herein by reference herein for all purposes.

BACKGROUND

1. Field

The following description relates to a brake pedal assembly, a brake apparatus for a vehicle including the same, and a control method thereof.

2. Description of Related Art

The statements in this section merely provide background information related to the present disclosure and do not necessarily constitute prior art.

When a driver of a running vehicle depresses the brake pedal, the vehicle decelerates or stops in response to the depression stroke. An in-vehicle control unit may use a stroke sensor disposed near the brake pedal to detect information on the depression stroke and calculate a required braking force based on the detected information. Accordingly, a failure that happens in the stroke sensor will disable the control unit from controlling a vehicle brake apparatus because it can no longer calculate the required braking force corresponding to the driver's depression of the pedal even when the driver is meant to stop.

Conventional prevention of this peril has been to arrange pressure sensors around a master cylinder. When a failure occurred in the stroke sensor, the depression stroke was estimated based on the amount of pressure changed by the pedal depression, and the required braking force was calculated.

However, arranging the pressure sensors around the master cylinder undesirably increases the manufacturing cost by adding to the rise in component requirements.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a brake pedal assembly, including a pedal, a stroke sensor configured to detect a depression stroke of the pedal, Hall sensors spaced apart from each other in a direction parallel to an operation direction of the pedal, and a controller configured to determine the depression stroke of the pedal using any one or any combination of the stroke sensor and the Hall sensors and to determine a required braking force of a vehicle, in response to the depression stroke of the pedal.

The Hall sensors may include first to N-th Hall sensors (where N is a natural number equal to or greater than 3), and wherein spacing between the Hall sensors increases from the first Hall sensor that is closest to an initial position of the pedal to the N-th Hall sensor that is farthest from the initial position of the pedal.

The controller may be configured to detect and to count rising edges and falling edges of the Hall sensors, in response to the pedal being depressed, and to cause a pre-storage of the depression stroke of the pedal according to counts of the rising edges and the falling edges.

The controller may be configured to compare a first depression stroke of the pedal calculated by the stroke sensor with a second depression stroke of the pedal calculated by the Hall sensors, determine whether a difference of the first depression stroke and the second depression stroke exceeds a threshold, and determine that a failure has occurred in the stroke sensor, in response to the difference exceeding the threshold.

The controller may be configured to use preset values, in response to a determination that the failure has occurred in the stroke sensor.

The controller may be configured to determine whether a first detected time of a rising edge of the first Hall sensor and a second detected time of a rising edge of the second Hall sensor are shorter than preset times, and determine that the vehicle is in an emergency braking situation, in response to the first detected time and the second detected time being shorter than the preset times.

In another general aspect, there is provided brake apparatus for a vehicle, including a pedal, a stroke sensor configured to detect a depression stroke of the pedal, Hall sensors spaced apart from each other in a direction parallel to an operation direction of the pedal, a controller configured to determine the depression stroke of the pedal using any one or any combination of the stroke sensor and the Hall sensors and to determine a required braking force of a vehicle, in response to the depression stroke of the pedal, a hydraulic circuit configured to transmit hydraulic pressure to wheels of the vehicle based on the required braking force, and a solenoid valves configured and disposed to regulate flows of the hydraulic pressure in the hydraulic circuit.

In another general aspect, there is provided a method of controlling a brake pedal assembly for calculating a required braking force of a vehicle using a stroke sensor configured to detect a depression stroke of a pedal and using of Hall sensors spaced apart from each other in a direction parallel to an operation direction of the pedal, the method including comparing a first depression stroke of the pedal calculated using the stroke sensor with a second depression stroke of the pedal calculated using the Hall sensors, determining whether a difference in a value of the first depression stroke and a value of the second depression stroke exceeds a threshold, determining that a failure has occurred in the stroke sensor, in response to the difference exceeding the threshold, and estimating the depression stroke of the pedal using a preset value, in response to the failure occurring in the stroke sensor.

The method may include detecting and counting rising edges and falling edges of the Hall sensors, and pre-storing the depression stroke of the pedal according to counts of the rising edges and the falling edges.

The estimating of the depression stroke may include determining that the vehicle is in an emergency braking situation, in response to determining that a failure has occurred in the stroke sensor and that the rising edges and the falling edges are counted up in a time that is shorter than preset times.

The method may include calculating a braking force using an estimated depression stroke.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Figure 1:
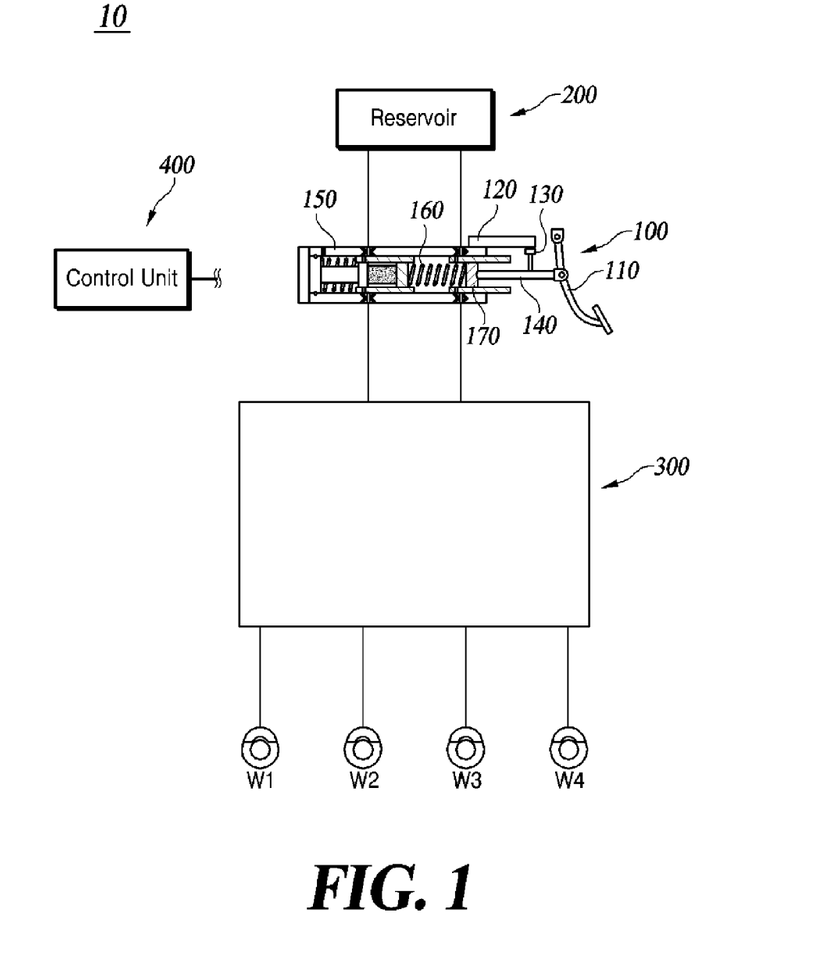
FIG. 1 is a schematic diagram of a vehicle brake apparatus according to at least one embodiment of the present disclosure.
Figure 2:
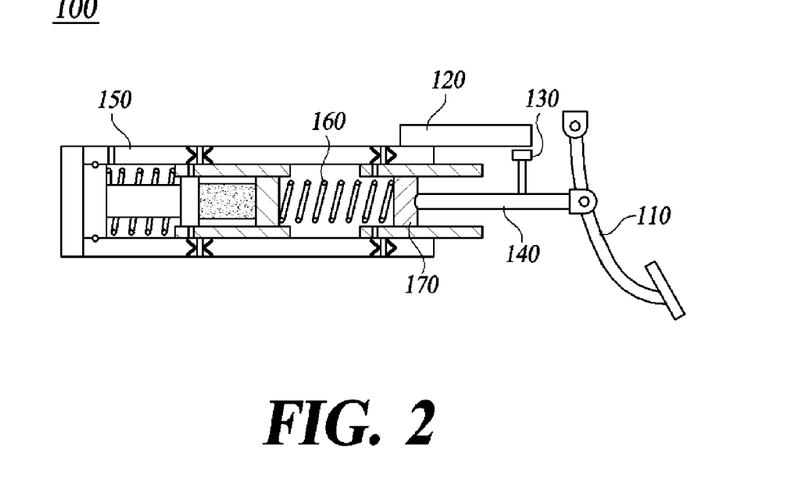
FIG. 2 is a schematic diagram of a brake pedal assembly according to at least one embodiment of the present disclosure.
Figure 3:
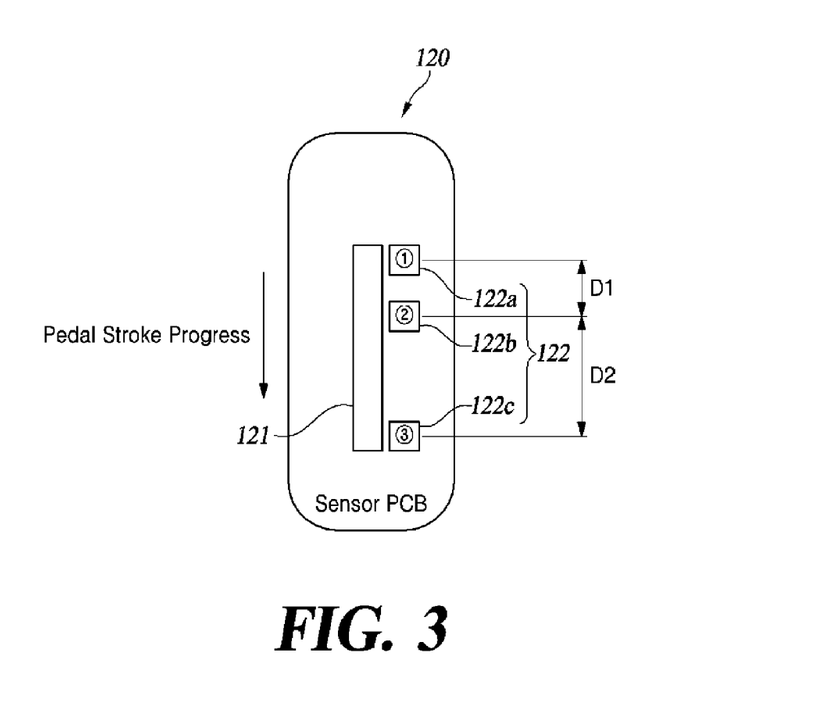
FIG. 3 is a diagram of a plurality of sensors disposed in a sensor PCB of FIG. 2.
Figure 4:
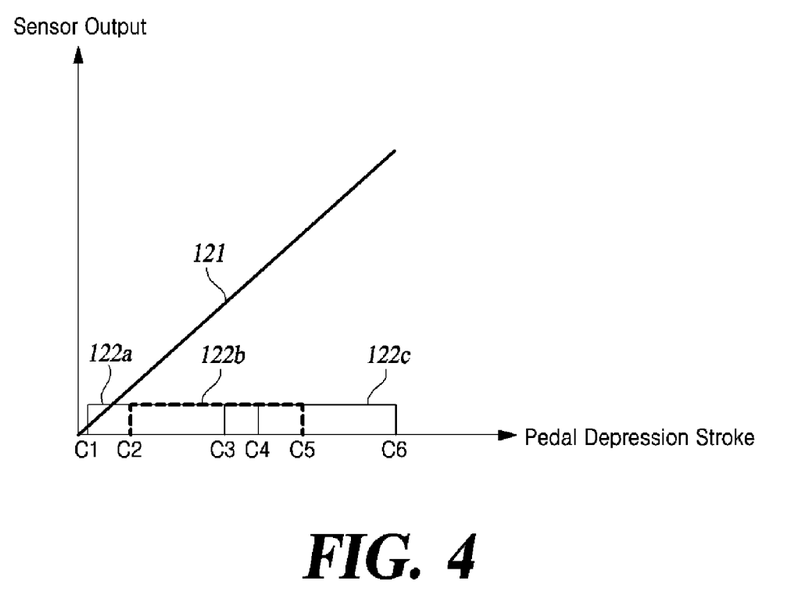
FIG. 4 is a graph illustrating sensor outputs according to pedal positions according to at least one embodiment of the present disclosure.

FIG. 1 is a schematic diagram of a brake apparatus 10 for a vehicle according to at least one embodiment of the present disclosure. FIG. 2 is a schematic diagram of a brake pedal assembly 100 according to at least one embodiment. FIG. 3 is a diagram of a plurality of sensors disposed in a sensor printed circuit board (PCB) 120 of FIG. 2. FIG. 4 is a graph illustrating sensor outputs according to pedal positions according to at least one embodiment.

As shown in FIGS. 1 and 2, the brake apparatus 10 for a vehicle includes all or some of the brake pedal assembly 100, a reservoir 200, a braking unit 300 (the braking unit 300 may also be referred to as braking module 300), a plurality of wheel brakes W1, W2, W3, W4, and a control unit 400 (the control unit 400 may also be referred to as controller 400).

The braking unit 300 may include a hydraulic circuit, a plurality of solenoid valves, and a hydraulic pressure supply unit. The control unit 400 may control a motor disposed in the hydraulic supply unit according to the required braking force to adjust the hydraulic pressure supplied to the plurality of wheel brakes W1, W2, W3, and W4. The hydraulic circuit is configured to transmit hydraulic pressure over to the wheels of the vehicle. The solenoid valves are arranged to regulate flows of hydraulic pressure in the hydraulic circuit. Those of ordinary skill in the art can provide the layout of the hydraulic circuit and the solenoid valves with different design variations. For example, four inlet valves may be disposed to control the amount of hydraulic pressure supplied to each of the plurality of wheel brakes W1, W2, W3, W4, and four outlet valves may be disposed to control the amount of the hydraulic pressure to withdraw from the plurality of wheel brakes W1, W2, W3, W4, although other layouts than this arrangement are envisioned in the present disclosure.

The plurality of wheel brakes W1, W2, W3, W4 include a first wheel brake W1 for braking the rear left wheel of the vehicle, a second wheel brake W2 for braking the rear right wheel, a third wheel brake W3 for braking the front left wheel, and a fourth wheel brake W4 for braking the front right wheel. Here, the first to fourth wheel brakes W1 to W4 are formally defined so for the convenience of explanation, and the positions of the first to fourth wheel brakes W1 to W4 are not limited to those as defined above.

The brake pedal assembly 100 includes all or some of a pedal 110, a rod 140, a magnet 130, the sensor PCB 120, a master cylinder 150, and an elastomer or elastic body 160. When the driver depresses the pedal 110, the control unit 400 may detect the depression stroke by using the sensor PCB 120, calculate the required braking force, and supply a hydraulic braking pressure to each of the plurality of wheel brakes W1, W2, W3, W4.

The rod 140 may have one end connected to the pedal 110 and the other end connected to the piston 170. The rod 140 moves the piston 170 left and right based on the depression stroke of the pedal 110, that is, the displacement of the pedal 110.

The magnet 130 is disposed on a portion of the rod 140. The magnet 130 may be disposed facing toward the sensor PCB 120. The magnet 130 moves in unison with the movement of the rod 140 according to the depression of the pedal 110. In other words, the magnet 130 may be moved along the depression direction of the pedal 110.

The sensor PCB 120 is disposed adjacent to the magnet 130. As shown in FIG. 3, the sensor PCB 120 may be mounted with a stroke sensor 121 and a plurality of Hall sensors 122. The stroke sensor 121 may be disposed to extend along a direction parallel to the direction in which the magnet 130 moves. The plurality of Hall sensors 122 may be disposed to be spaced apart along a direction parallel to the direction in which the magnet 130 moves. Three or more Hall sensors 122 may be disposed on the sensor PCB 120. The stroke sensor 121 and the Hall sensors 122 may be mounted on the single sensor PCB 120 to form an integral structure.

The stroke sensor 121 may output different voltages according to the depression stroke of the pedal 110. The stroke sensor 121 may be configured to have its output voltage increase as the pedal 110 is depressed toward the master cylinder 150. The control unit 400 may estimate the depression stroke of the pedal 110 or the position of the pedal 110 by using a voltage that relates to the position of the pedal 110. The internal structure of the master cylinder 150 shown in FIGS. 1 and 2 is exemplary and not limited to those as illustrated.

The plurality of Hall sensors 122 may include a first Hall sensor to an N-th Hall sensor, where N is a natural number greater than or equal to 3. The plurality of Hall sensors 122 as illustrated in FIG. 3 includes a first Hall sensor 122a to a third Hall sensor 122c. The following description will refer to FIG. 3.

The first Hall sensor 122a to the third Hall sensor 122c are spaced apart from each other in a direction parallel to the operational direction of the magnet 130. In other words, the first Hall sensor 122a to the third Hall sensor 122c are spaced apart from each other in a direction parallel to the operational direction of the pedal 110. The first Hall sensor 122a is disposed to be closest to an initial position of the pedal 110. The second Hall sensor 122b is disposed to be spaced apart from the first Hall sensor 122a by a first distance D1. The third Hall sensor 122c is disposed to be spaced apart from the second Hall sensor 122b by a second distance D2. The third Hall sensor 122c is disposed at the farthest from the initial position of the pedal 110. Here, the initial position refers to the position of the magnet 130 where the pedal 110 is not depressed.

First distance D1 that is a distance between the first Hall sensor 122a and the second Hall sensor 122b may be different from the second distance D2 that is a distance between the second Hall sensor 122b and the third Hall sensor 122c. First distance D1 may be smaller than second distance D2. In other words, when the Hall sensors 122 are sequentially spaced apart from the initial position, they may be arranged with gradually increased distances.

The control unit 400 is configured to calculate the depression stroke of the pedal 110 by using any one or more of the stroke sensor 121 and the plurality of Hall sensors 122 and to calculate a required braking force of the vehicle based on the calculated depression stroke of the pedal 110. The control unit 400 may utilize the calculated required braking force to control the braking unit 300 to transmit the braking hydraulic pressure to each of the plurality of wheel brakes W1, W2, W3, W4.

The control unit 400 calculates the depression stroke of the pedal 110 based on the output voltage of the stroke sensor 121 unless a failure occurs in the stroke sensor 121. The control unit 400 may determine whether a failure occurs in the stroke sensor 121 by using the plurality of Hall sensors 122.

The following describes a case where the multiple Hall sensors 122 are configured by the first Hall sensors 122a to the third Hall sensors 122c as shown in FIG. 3. As shown in FIG. 4, the magnet 130 when moving as the pedal 110 is depressed forms one rising edge and one falling edge while the magnet 130 passes one Hall sensor. Three Hall sensors 122 will form three rising edges and three falling edges. The depression strokes of the pedal 110, corresponding to the points at which the rising edges and the falling edges are detected may be stored in advance in the control unit 400. The control unit 400 may count rising edges or falling edges of the plurality of Hall sensors 122, and calculate the depression strokes of the pedal 110, corresponding to those counts. In particular, the control unit 400 may calculate the depression strokes of the pedal 110 at points C1 to C6 in FIG. 4 by using the plurality of Hall sensors 122.

The control unit 400 may compare the first depression stroke calculated by using the stroke sensor 121 with the second depression stroke calculated by using the plurality of Hall sensors 122. The plurality of Hall sensors 122 once provided is responsive exclusively to a detected rising edge or falling edge for calculating the depression stroke of the pedal 110. Therefore, the comparison of magnitudes between the first depression stroke and the second depression stroke can be performed when a rising edge or a falling edge is detected by the plurality of Hall sensors 122. When the stroke sensor 121 is normal, the first depression stroke and the second depression stroke are equal or have a difference within a preset margin of error. However, when a failure occurs in the stroke sensor 121, the first depression stroke may have a value outside the preset margin of error against the second depression stroke. The control unit 400 may determine based on this property whether a failure has occurred in the stroke sensor 121.

Figure 5A:
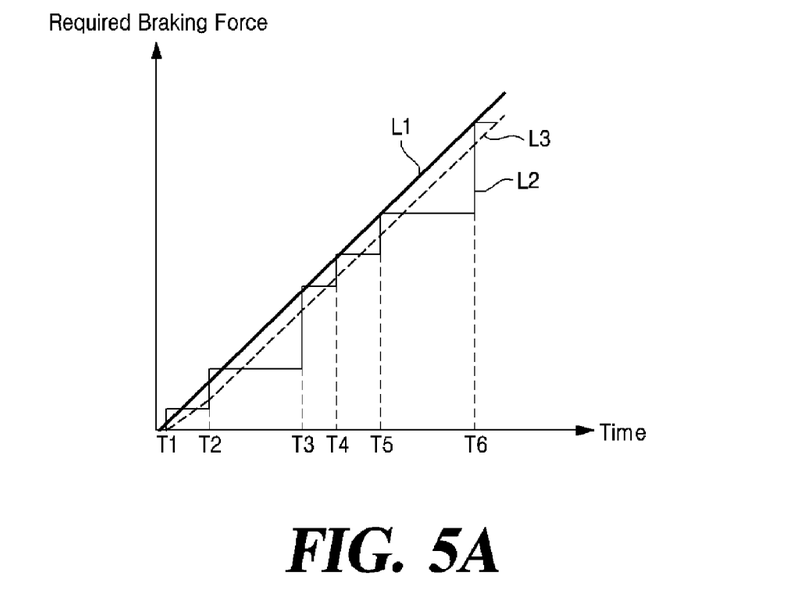
FIGS. 5A-5B illustrate examples of graphs of a required braking force over time for explaining a method of controlling a brake pedal assembly according to at least one embodiment of the present disclosure.
Figure 5B:
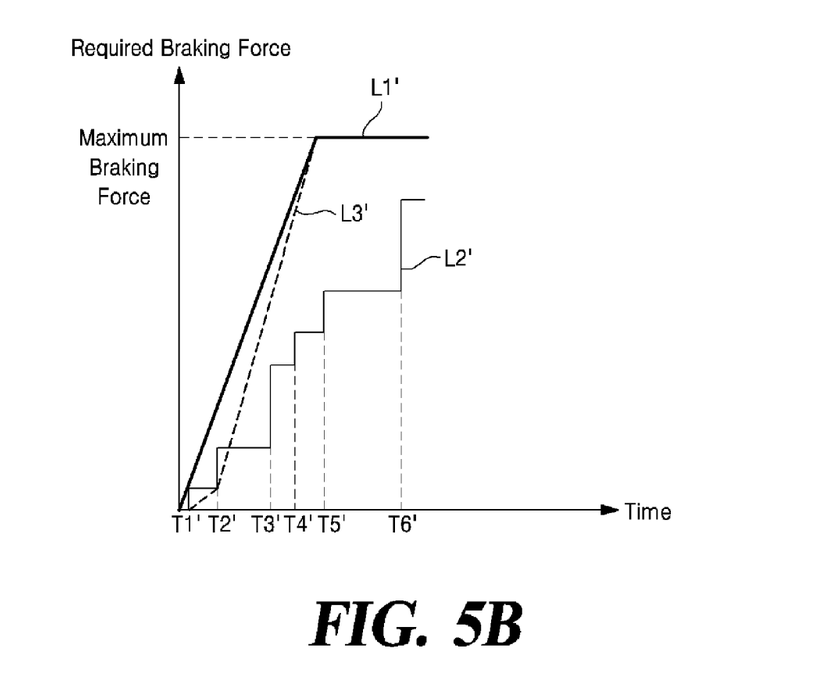

FIGS. 5A-5B illustrate graphs of a required braking force over time for explaining a method of controlling a brake pedal assembly according to at least one embodiment of the present disclosure. FIGS. 5A-5B illustrates graph for estimating the required braking force by using the plurality of Hall sensors 122 when the control unit 400 determines that a failure has occurred in the stroke sensor 121. The graphs in FIGS. 5A and 5B are illustrated on the premise that the depression stroke of the pedal 110 gradually increases as time increases.

FIG. 5A is a graph regarding a control method in a general braking situation, FIG. 5B is a graph regarding a control method in an emergency braking situation.

In FIG. 5A, L1 denotes the required braking force calculated by the control unit 400 when the stroke sensor 121 is normal, L2 the required braking force calculated by the control unit 400 using a plurality of Hall sensors 122, and L3 an estimated required braking force by using a plurality of Hall sensors 122 when a failure occurs in the stroke sensor 121. T1 to T6 refer to times when detecting a rising edge or a falling edge of the plurality of Hall sensors 122. The shorter the interval between T1 to T6 is, the faster the depression speed of the pedal 110 is.

The control unit 400 compares the magnitudes between the first depression stroke and the second depression stroke at time T1. At this time, when the first depression stroke and the second depression stroke have a differential magnitude outside the preset margin of error, the control unit 400 may increase the required braking force over time to a preset slope without using the stroke sensor 121.

The control unit 400 also compares the magnitudes between the first depression stroke and the second depression stroke at time T2 as at time T1. Even in this case, when the differential magnitude between the first depression stroke and the second depression stroke is outside the preset margin of error, the control unit 400 determines that a failure has occurred in the stroke sensor 121. Thereafter, the control unit 400 may apply the preset slope of the required braking force to increase the required braking force until the next rising edge or falling edge is detected. The control unit 400 may determine whether a failure has occurred in the stroke sensor 121 by comparing the magnitudes between the first depression stroke and the second depression stroke at any time points of time T1 to T6. The estimation of the required braking force of the control unit 400 may be formed in the graph as with plot L3 but is not so limited. In other words, when the first depression stroke and the second depression stroke are compared and they have the differential magnitude that is outside a preset margin of error, various methods may be employed to estimate the required braking force.

In FIG. 5B, L1' denotes the required braking force calculated by the control unit 400 in an emergency braking situation when the stroke sensor 121 is normal, L2' the required braking force calculated by the control unit 400 using a plurality of Hall sensors 122, and L3' an estimated required braking force by using a plurality of Hall sensors 122 when a failure occurs in the stroke sensor 121. T1' to T6' refer to times when detecting a rising edge or a falling edge of the plurality of Hall sensors 122.

The driver quickly depresses the pedal 110 when an emergency braking situation occurs while driving the vehicle. Then, the intervals between T1' to T6' may be shorter than the intervals between T1 to T6.

The control unit 400 measures the intervals between T1' and T2'. When it is determined that the intervals between T1' and T2' are shorter than preset times, the control unit 400 may determine that the vehicle is in an emergency braking situation. When an abnormality occurs in the stroke sensor 121, the control unit 400 can determine whether the vehicle is in emergency braking condition only at time T2', so the shorter the first interval D1 in the Hall sensors 122, the faster the determination can be made on the emergency braking situation. Therefore, as described above, when the first Hall sensors 122a to 122c are disposed to be spaced apart from each other by the first distance D1 and the second distance D2, the first distance D1 is better set to be smaller than the second distance D2 to enable a quicker decision of the emergency braking situation. The slope of the required braking force after time T2' may be set to become larger as the time interval between T1' and T2' is shorter.

Figure 6:
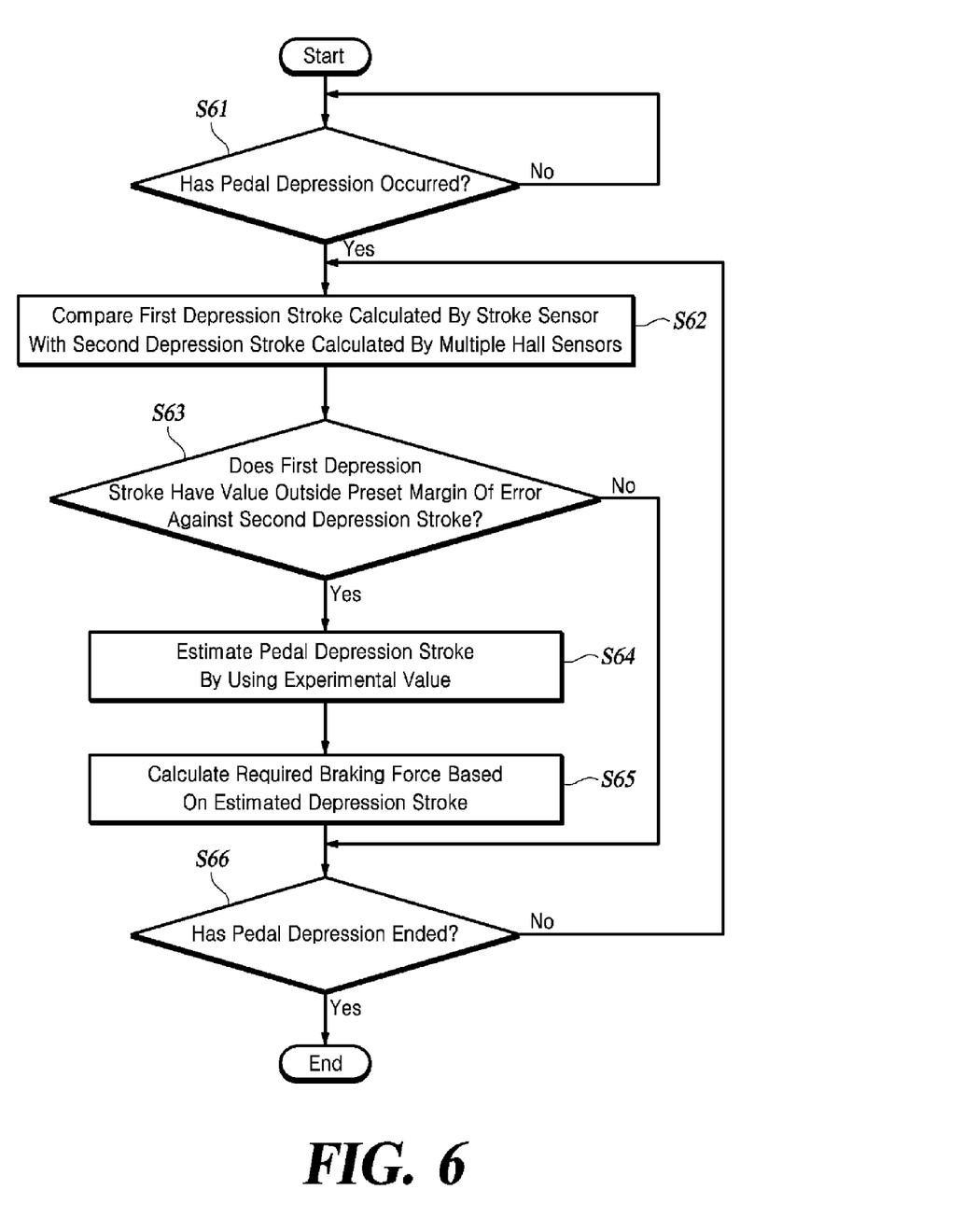
FIG. 6 is a flowchart of a method of controlling a brake pedal assembly according to at least one embodiment of the present disclosure.

FIG. 6 is a flowchart of a method of controlling a brake pedal assembly according to at least one embodiment of the present disclosure. Overlapped contents with the above will not be repeated below.

The control unit 400 determines whether depression has occurred in the pedal 110 (S61). Whether the pedal 110 is depressed may be determined by using the stroke sensor 121 or by whether a first rising edge is detected out of the plurality of Hall sensors 122. When it is determined that the pedal 110 is not depressed, the control unit 400 continues to perform Step S61.

Upon determining that the pedal 110 is depressed, the control unit 400 compares the first depression stroke calculated by using the stroke sensor 121 with the second depression stroke calculated by using the plurality of Hall sensors 122 (S62). Whenever detecting the rising edge and the falling edge of the plurality of Hall sensors 122, the control unit 400 may compare the magnitudes between the first depression stroke and the second depression stroke.

The control unit 400 determines whether the first depression stroke has a value outside a preset margin of error against the second depression stroke (S63). An error may occur in the first depression stroke calculated by the stroke sensor 121 due to noise which is accounted for in setting an allowable margin of error in advance.

When it is determined that the first depression stroke has a value outside the preset margin of error against the second depression stroke, the control unit 400 estimates the depression stroke of the pedal by using a preset slope of the required braking force (S64). Here, the preset slope may be determined in advance.

The control unit 400 calculates the required braking force by using the estimated depression stroke (S65). The calculated required braking force may be obtained by considering not only the estimated depression stroke but also the speed at which the driver depresses the pedal 110. For example, when it is determined that the driver depresses the pedal 110 while causing the time interval between T1' and T2' to be shorter than the preset interval as shown in FIG. 5B, the control unit 400 can take it as an emergency braking situation and offer a greater calculated required braking force. Although not shown in the drawings, according to another embodiment of the present disclosure, Step S64 is omitted and the control unit 400 directly estimates the required braking force.

The control unit 400 determines whether the pedal depression has ended (S66).

Although FIG. 6 presents the respective steps thereof as being sequentially performed, it merely instantiates the technical idea of some embodiments of the present disclosure. Therefore, a person having ordinary skill in the pertinent art could incorporate various modifications, additions, and substitutions in practicing the present disclosure by changing the sequence of steps illustrated by FIG. 6 or by performing one or more of the steps thereof in parallel, and hence the steps in FIG. 6 are not limited to the illustrated chronological sequences.

As described above, provided are a brake pedal assembly that estimates the depression stroke even with a stroke sensor failure.

As described above, provided are a brake pedal assembly that reduces the manufacturing cost thereof by using a plurality of Hall sensors in place of pressure sensors.

As described above, the brake pedal assembly obviates the need for pressure sensors and mounts the Hall sensors on the same PCB that mounts the stroke sensor, to bring the manufacturing cost down.

The apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The computer-readable recording medium includes any type of recording device on which data that can be read by a computer system are recordable. Examples of the computer-readable recording medium include non-volatile or non-transitory media such as a ROM, CD-ROM, magnetic tape, floppy disk, memory card, hard disk, optical/magnetic disk, storage devices, and the like. The computer-readable recording medium further includes transitory media such as data transmission medium. Further, the computer-readable recording medium can be distributed in computer systems connected via a network, wherein the computer-readable codes can be stored and executed in a distributed mode.

Various implementations of the systems and techniques described herein can be realized by a programmable computer. Here, the computer includes a programmable processor, a data storage system (including volatile memory, nonvolatile memory, or any other type of storage system or a combination thereof), and at least one communication interface. For example, the programmable computer may be one of a server, a network device, a set-top box, an embedded device, a computer expansion module, a personal computer, a laptop, a personal data assistant (PDA), a cloud computing system, and a mobile device.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

REFERENCE NUMERALS

10: brake apparatus for vehicle
100: brake pedal assembly

200: reservoir
300: braking unit
400: control unit
120: sensor PCB
110: pedal
121: stroke sensor
122: multiple Hall sensors
130: magnet
140: rod
150: master cylinder
160: elastic body
170: piston

What is claimed is:

1. A brake pedal assembly, comprising:
a pedal;
a stroke sensor configured to detect a depression stroke of the pedal;
Hall sensors spaced apart from each other in a direction parallel to an operation direction of the pedal and disposed adjacent to the stroke sensor on a single printed circuit board (PCB) to form an integrated structure, wherein a first distance between a first Hall sensor and a second Hall sensor is less than a second distance between the second Hall sensor and a third Hall sensor to enable a quicker decision of an emergency braking situation, the first Hall sensor being closest to the pedal; and
a controller configured to determine the depression stroke of the pedal using any one or any combination of the stroke sensor and the Hall sensors and to determine a required braking force of a vehicle, in response to the depression stroke of the pedal,
wherein the controller is further configured to:
compare a first depression stroke of the pedal calculated by the stroke sensor with a second depression stroke of the pedal calculated by the Hall sensors;
determine whether a difference between the first depression stroke and the second depression stroke exceeds a threshold;
determine that a failure has occurred in the stroke sensor, in response to the difference exceeding the threshold;
estimate the depression stroke of the pedal using a preset value determined in advance via experiments when the stroke sensor failed;
calculate the required braking force of the vehicle based on both the estimated depression stroke and a braking speed at which a driver presses the pedal; and
control a braking unit comprising wheel brakes using the calculated required braking force in a normal braking situation when the braking speed is less than a preset speed, and control the braking unit using a greater calculated required braking force in the emergency braking situation when the braking speed is greater than the preset speed.

2. The brake pedal assembly of claim 1, wherein the Hall sensors includes first to N-th Hall sensors (where N is a natural number equal to or greater than 3), and
wherein a spacing between the Hall sensors increases from the first Hall sensor closest to an initial position of the pedal to the N-th Hall sensor farthest from the initial position of the pedal.

3. The brake pedal assembly of claim 2, wherein the controller is further configured to detect and count rising edges and falling edges of the Hall sensors in response to the pedal being depressed, and to pre-store the depression stroke of the pedal based on counts of the rising edges and the falling edges.

4. The brake pedal assembly of claim 1, wherein the controller is further configured to use preset values, in response to a determination that the failure has occurred in the stroke sensor.

5. The brake pedal assembly of claim 1, wherein the controller is further configured to:
determine whether a first detected time of a rising edge of the first Hall sensor and a second detected time of a rising edge of the second Hall sensor are shorter than preset times; and
determine that the vehicle is in the emergency braking situation, in response to the first detected time and the second detected time being shorter than the preset times.

6. A method of controlling a brake pedal assembly for calculating a required braking force of a vehicle using a stroke sensor configured to detect a depression stroke of a pedal and Hall sensors spaced apart from each other in a direction parallel to an operation direction of the pedal, the Hall sensors and the stroke sensor being disposed adjacent to each other on a single printed circuit board (PCB) to form an integrated structure, wherein a first distance between a first Hall sensor and a second Hall sensor is less than a second distance between the second Hall sensor and a third Hall sensor to enable a quicker decision of an emergency braking situation, the first Hall sensor being closest to the pedal, the method comprising:
comparing a first depression stroke of the pedal, calculated using the stroke sensor, with a second depression stroke of the pedal, calculated using the Hall sensors;
determining whether a difference between a value of the first depression stroke and a value of the second depression stroke exceeds a threshold;
determining that a failure has occurred in the stroke sensor in response to the difference exceeding the threshold;
estimating the depression stroke of the pedal using a preset value determined in advance via experiments when the stroke sensor failed;
calculating the required braking force of the vehicle based on both the estimated depression stroke and a braking speed at which a driver presses the pedal; and
control a braking unit comprising wheel brakes using the calculated required braking force in a normal braking situation when the braking speed is less than a preset speed, and control the braking unit using a greater calculated required braking force in the emergency braking situation when the braking speed is greater than the preset speed.

7. The method of claim 6, further comprising:
detecting and counting rising edges and falling edges of the Hall sensors, and pre-storing the depression stroke of the pedal based on counts of the rising edges and the falling edges.

8. The method of claim 7, wherein the estimating of the depression stroke comprises:
determining that the vehicle is in the emergency braking situation, in response to determining that a failure has occurred in the stroke sensor and that the rising edges and the falling edges are counted up in a time that is shorter than preset times.

9. The method of claim 6, further comprising:
calculating a braking force using an estimated depression stroke.

10. A brake pedal assembly, comprising:
a pedal;

a stroke sensor configured to detect a depression stroke of the pedal;

Hall sensors spaced apart from each other in a direction parallel to an operation direction of the pedal and disposed adjacent to the stroke sensor on a single printed circuit board (PCB) to form an integrated structure, wherein a first distance between a first Hall sensor and a second Hall sensor is less than a second distance between the second Hall sensor and a third Hall sensor to enable a quicker decision of an emergency braking situation, the first Hall sensor being closest to the pedal; and a controller configured to:

determine the depression stroke of the pedal using any one or any combination of the stroke sensor and the Hall sensors;

determine a required braking force of a vehicle, in response to the depression stroke of the pedal;

estimate the depression stroke of the pedal using a preset value determined in advance via experiments when the stroke sensor failed;

calculate the required braking force of the vehicle based on both the estimated depression stroke and a braking speed at which a driver presses the pedal; and control a braking unit comprising wheel brakes using the calculated required braking force in a normal braking situation when the braking speed is less than a preset speed, and control the braking unit using a greater calculated required braking force in the emergency braking situation when the braking speed is greater than the preset speed.

* * * * *